United States Patent [19]

Eisenmann et al.

[11] 4,155,686

[45] May 22, 1979

[54] HYDROSTATIC INTERMESHING GEAR MACHINE WITH SUBSTANTIALLY TROCHOIDAL TOOTH PROFILE AND ONE CONTACT ZONE

[75] Inventors: Siegfried Eisenmann; Hermann Härle, both of Aulendorf, Fed. Rep. of Germany

[73] Assignee: Fürstlich Hohenzollernsche Hüttenverwaltung Laucherthal, Laucherthal, Fed. Rep. of Germany

[21] Appl. No.: 832,442

[22] Filed: Sep. 12, 1977

[30] Foreign Application Priority Data

Oct. 1, 1976 [DE] Fed. Rep. of Germany ....... 2644531

[51] Int. Cl.$^2$ .......................... F01C 1/10; F01C 21/00; F03C 3/00; F04C 1/06
[52] U.S. Cl. ..................................... 418/170; 418/190; 74/462
[58] Field of Search .............................. 418/166–171, 418/190; 74/413, 462

[56] References Cited

U.S. PATENT DOCUMENTS

| | | | |
|---|---|---|---|
| 3,126,833 | 3/1964 | Hill | 418/190 |
| 3,548,789 | 12/1970 | Creek | 418/170 |
| 3,782,040 | 1/1974 | Harle et al. | 51/67 |
| 3,907,470 | 9/1975 | Harle et al. | 418/170 |
| 3,995,978 | 12/1976 | Khan et al. | 418/171 |

*Primary Examiner*—John J. Vrablik
*Attorney, Agent, or Firm*—Heinrich W. Herzfeld; Gilbert L. Wells

[57] ABSTRACT

A hydrostatic gear machine is described which comprises a pair of gear wheels meshing with one another, one of the gear wheels being an internally toothed annular gear wheel and the other an externally toothed pinion, the tooth profile of at least one of said wheels being at least substantially trochoidal; the tooth profile of a first one of the two wheels being defined as being obtained by rolling the first wheel with meshing on the other wheel. The teeth of at least one of said wheels bear the thus defined profile only on a limited zone having a length just sufficient for the ratio of the angles of rotation of the two wheels to be constant throughout rotation of the wheels, and have their profile set back, outside the said limited zone, by a sufficient distance to eliminate contact, outside the limited zone, with the teeth of the other gear wheel.

16 Claims, 4 Drawing Figures

HYDROSTATIC INTERMESHING GEAR MACHINE WITH SUBSTANTIALLY TROCHOIDAL TOOTH PROFILE AND ONE CONTACT ZONE

BACKGROUND OF THE INVENTION

The invention relates to a hydrostatic gear machine comprising a pair of gear wheels meshing with one another, one of said gear wheels being an internally toothed annular gear wheel and the other an externally toothed pinion, the tooth profile of at least one of said wheels being at least substantially trochoidal.

The expression "substantially trochoidal gearwheels" is intended herein to cover not only a pair of gearwheels of which at least one wheel has a trochoidal toothing, in particular, a cycloidal toothing, but also a pair of gearwheels of which at least one wheel has a circularly arcuate toothing, since in the case of the latter the profile of the flanks of the teeth is very similar to that of a trochoidal toothing.

The invention is particularly concerned with a pair of gearwheels of this kind wherein the difference in the number of teeth of the annular wheel on the one hand and the pinion on the other is very small but is greater than one.

Rotary fluid-displacing machines having pairs of gearwheels of this kind offer the advantages of a very compact construction, a small space-requirement, good delivery and suction capacities, low pulsation during fluid delivery, low tooth-engagement frequencies, reduced noise when operating, and the possibility of providing the pinion with a very thick shaft or forming therein a very large opening through which the shaft passes. They are particularly suitable as feed pumps which can be directly fitted, in an economical manner, on the main shafts of considerably larger engines or motors so as to form an integral part thereof.

A pair of trochoidal gearwheels of this kind is disclosed for example in German Offenlegungsschriften Nos. 2,024,339 2,041,483 and 2,318,753 (equivalent to U.S. Pat. No. 3,907,470), and in U.S. Pat. No. 3,782,040.

Advantageously, the toothing of the annular wheel in such gear machines is initially determined with a view to the width of the root of the tooth being approximately equal to twice the width of the gap between teeth at the root circle. A provisional form of tooth is then established in the form of a triangle, the height of which is approximately three-fifths of the width of the root of the tooth. The shorter sides forming the flanks of the tooth are then uniformly outwardly curved to give a convex form, so that a tooth profile is created as shown, for example, in German Pat. OS No. 2,024,339, wherein the apices of the tooth profiles that are determined in this manner are at a distance of approximately one-twentieth of the width of the root from the corresponding sides of the triangle.

With pairs of trochoidal gear wheels of this kind, the degree of overlapping is very much greater than one, and is generally a multiple of one, since the line of engagement winds around the pinion. If the shapes of the flanks of both gearwheels were obtained in an absolutely faultless manner and if the gearing operated absolutely without clearance, there would be no objection to this extended tooth engagement having a large overlap.

In practice, however, such precision and operating conditions can never be achieved. Errors in the flanks of the teeth, in revolution and in pitch, as well as errors in the direction of the flanks, and the fact that the distance between axes differs from the nominal can lead to jamming, and always to mechanical noise even with a predetermined clearance between the flanks of the teeth. If attempts are made to combat difficulties are regards engagement by the use of an excessively large clearance between flanks, as has been done in some known machines, then, because of dynamic oscillations and disparities in the rotary movements of the two wheels or, in the case of hydrostatic machines, because of squeezing pressures, mechanical noise and loading occur whenever a change in the bearing zones on the flanks of the teeth takes place. In the case of geared pumps it is therefore also necessary to accept a rather considerable loss in volumetric efficiency, and a greatly increased pulsation during delivery.

OBJECTS AND SUMMARY OF THE INVENTION

It is a main object of the invention to provide a hydrostatic gear machine of the initially described type in which the above-mentioned drawbacks of such machines having trochoidal, or at least substantially trochoidal gear-wheels can be largely or practically completely eliminated.

In the pair of at least substantially trochoidal gear wheels of the hydrostatic gear machine according to the invention, this object is attained by the features of (a) the tooth profile of a first one of the two wheels being defined as a profile obtained by rolling said first wheel with meshing on the other wheel; (b) the teeth of at least one of said wheels bearing the thus defined profile only on a limited zone having a length just sufficient for the ratio of the angles of rotation of the two wheels to be constant throughout rotation of the wheels, and (c) these teeth having their profile set back outside said limited zone, by a sufficient distance to eliminate contact, outside said limited zone, with the teeth of the other wheel.

The overlap degree of the two wheels is thus limited to substantially one, i.e. the engagement of the teeth of the two wheels is utilized only in the zone of their deepest engagement and only in a minimum zone necessary for keeping the aforesaid ratio constant.

In hydrostatic geared pumps and geared engines, this offers the considerable advantage that the transmission of torque from one gear wheel to the other and therefore mechanically positive contact between the flanks of the teeth occur only in the teeth-sealed zone required between the operating spaces at a gap-filling piece, conventional in such machines, whereby a considerable improvement in volumetric efficiency and thus in the delivery output of the machine is achieved. This also results in an effective operation of the pair of gear wheels, in a machine according to the invention, becoming practically independent of the distance between the wheel axes, as would be the case in the operation of gear wheels having involute toothing. The danger of difficulties of engagement between the two wheels is greatly reduced, and so is wear.

Preferably, the generating line of the two gearwheels is parallel to the rotary axis of the wheel, as in the case of spur gears, while screw wheels can also be used in the hydrostatic gear machine according to the invention.

The limited zone of near trochoidal profile and the set-back portions mentioned hereinbefore can be produced by suitably shaping the teeth of either wheel or of both wheels. In practice, however, it is preferred that only the tooth profile of the pinion should be so shaped.

Preferably, also the portion of the addendum adjacent said set-back tooth flank is set back from at least a portion of the hypothetical addendum profile resulting from the rolling of said first wheel on the other wheel, by a sufficient distance to eliminate contact of said set-back addendum portion with the teeth of the other gear wheel.

However, this setting back of the tooth profile should not exceed the extent just necessary to avoid the aforesaid contact, since an excessive set-back would lead to undesirably large cavities between the two sets of teeth at the zone of deepest engagement. If, as is preferred, the annular gear wheel is the parent profile for the toothing, then the tooth flanks of the teeth of this wheel advantageously retain their theoretical shape, and the flanks of the teeth of the pinion, produced by a rolling motion in the annular gear wheel, are set back just so much that a sufficient clearance between the flanks of the teeth is ensured outside the limited engagement zone defined hereinbefore.

Since in the case of internally toothed annular gears, troubles relating to the engagement of the addendum of the tooth can, in particular, occur, the correction is preferably carried out at the addendum of the tooth. If the corrective curve is given circularly arcuate form, this offers the advantage that it is easy to control geometrically and technologically. The set-back is preferably constructed by dropping a perpendicular at the point where the above-mentioned portion of the tooth profile considered necessary, and the profile of the addendum meet, on which perpendicular the center point of the addendum-correcting arc must lie in order to ensure a tangential conversion of the flank of the tooth into a set-back rounding of the addendum of the tooth; (depending upon the constructional conditions, the length of the said portion which is deemed necessary may be increased or decreased; however, these differences should remain small). The arc of the rounding of the addendum should lie inside the theoretical tooth profile except at its commencement, so that no contact between teeth occurs in the zone of this set back arc. The resulting clearance between the teeth is important not only when they become disengaged but particularly when they become engaged with each other, since otherwise the teeth can strike against each other abruptly, causing considerable noise. For this reason the trailing flank of the tooth must also be corrected in this way. Consequently, teeth having precisely symmetrical tooth flanks, both in the annular gearwheel and on the pinion, are decidedly preferred.

According to another preferred feature, the teeth of the pinion have at their addenda small steps formed between the set-back portion of the tooth flank and the set-back addendum portion. This step can be a fraction of a millimeter high, e.g. from a few hundredths to a few tenths of a millimeter. The set-back tooth flank portion is preferably set back more deeply than the set-back addendum portion.

Further advantageous features which, in particular, result in a favorable form of the toothing as regards production, strength, wear, Hertz pressure, frequency behavior, the avoidance of drag between the addendum of the tooth and the casing, and the form of the casing in the case of pumps or engines, can be achieved by providing for the following features to the present in the teeth of the two gear wheels:

The tooth profile of the annular gear can be defined by a curve, preferably extending inside the dedendum circle of the latter gear, and being equidistant to and outside of a hypocycloid obtained by rolling a smaller circle inside a larger base circle concentric with the annular gear, the ratio of the diameter of the smaller circle to that of the base circle being 1:n or (n−1):n, n being an integer.

The ratio of the number of pinion teeth to the number of annular gear teeth is preferably a fraction the numerator and the denominator of which are relatively prime (aliquant).

Preferably, the pinion has two or three teeth less than the said annular gear wheel; in a particularly preferred embodiment of the machine according to the invention, the annular gear wheel has from 9 to 15 teeth, and most preferably, it has 9 or 11 teeth.

The distance between the flanks, turned toward one another, of adjacent teeth of the annular gear wheel, measured along the pitch circle of the latter, is preferably equal to the distance of the two flanks of one and the same tooth of the said annular gear wheel, also measured on the pitch circle thereof.

The machine usually comprises a cresent-shaped gap-filling piece in the range intermediate the addendum circles of the pinion and of the annular gear wheel, which range is opposite that of maximum meshing of the teeth of both wheels, so that the addendum faces of the wheels sealingly slide along the gap-filling piece.

BRIEF DESCRIPTION OF THE DRAWINGS

A preferred form of a pair of gearwheels in accordance with the invention will now be described in greater detail by reference to the accompanying drawings, in which.

DETAILED DESCRIPTION OF THE EMBODIMENT

Figure 1:
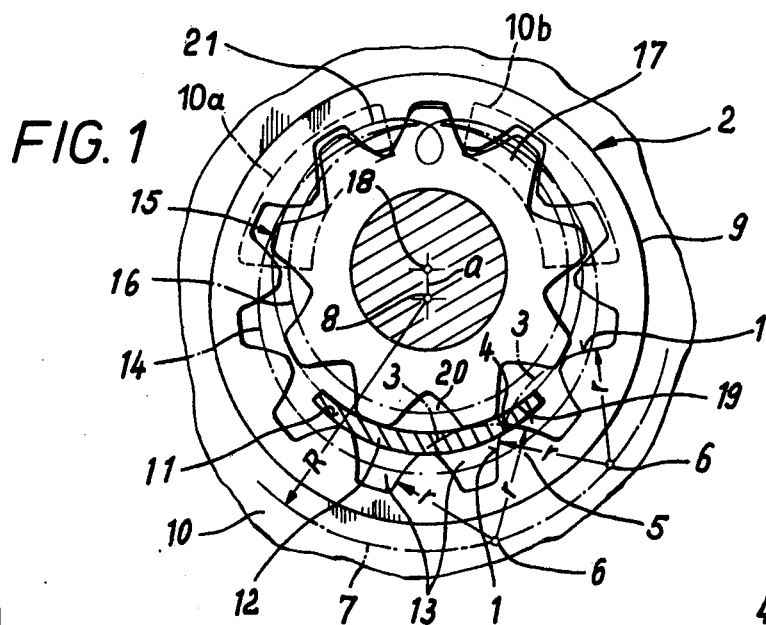
FIG. 1 shows schematically a general view of the two gearwheels of a geared pump, in accordance with the invention.

In the gear machine illustrated in FIG. 1, the profile 1 of the flanks of the internal teeth on the annular gear wheel 2 is formed for example by circles 3 having a radius r and each defining those flanks of adjacent teeth that face away from each other. The center-points 6 of the circles 3 of the tooth flanks all lie on a concentric circle 7 having a radius R and disposed around the center-point 8 of the annular gear wheel 2 and outside the latter. Each circle 3 may also cover three or more teeth of the hollow wheel instead of only two. Accordingly, more intersecting points 4 per arc will then be present.

As a rule, the annular gear wheel itself is rotatably mounted at its outer circular peripery 9 in a casing 10 only part of which is shown in the drawing. The casing 10 is provided with an outlet opening 10a for fluid and an inlet opening 10b for fluid in the same manner as shown in our earlier U.S. Pat. No. 3,907,470. The annular gear wheel 2 has an addendum circle 11 which is concentric with its circular periphery 9 and which coincides with the outer periphery of a crescent-shaped gap-filling piece 12, on which the ground surfaces of the addenda of the annular gear teeth slide during operation. Closed chambers 13 are thus formed between the teeth of the annular gear wheel 2 and piece 12, and during rotation these chambers cause a fluid filling them to be circulated. Preferably, the annular gear wheel 2 has an odd number of teeth, for example eleven, so that a first condition for aliquance (i.e. numerator and denominator of a fraction are relatively prime) is fulfilled, and vibration to a harmonic is avoided by a very large degree. The pitch circle 14 is advantageously so selected that the thickness of the teeth measured thereon is approximately equal to the gap between adjacent teeth of the same gear wheel.

The pinion 15 has fewer teeth than the annular gear wheel. The difference in the number of teeth of the two gear wheels will depend upon the required thickness of the gap-filling piece 12, the tooth-number ratio, the required frequency of engagement of teeth and the required shaft diameter, and upon the rate at which the pump is required to deliver fluid. The pitch circle 16 of the pinion is smaller than that of the annular gear wheel proportionately to the ratio of the numbers of teeth, and the distance between the wheel centers is a. The shape of the pinion tooth 17 is obtained by causing the toothing of the annular gear wheel 2, acting as a parent profile, to execute an orbital movement about the center-point 18 of the pinion, and at the same time to execute a rotary movement, i.e. a planetary movement, about its own center-point 8. If finely divided sand is imagined to be present inside this annular gear wheel profile, in the plane of the drawing, this sand would densely accumulate in an unoccupied residual area during planetary movement of the profile and thus would afford a picture of the internal contour of the teeth of the annular gear wheel 2. The internal contour thus represents the ideal external contour of the other wheel, being in engagement with the annular gear wheel, i.e. the pinion. If, in a kinematic simplification, the two center-points 8 and 18 are taken to be stationary in space, the angular speed of the orbital rotation becomes zero, and the planetary movement is simplified to become represented by two rotary movements. If, during the previously discussed planetary movement, the two pitch circles roll one upon the other without slip, the ratio of the last mentioned two rotary movements is constant in each position when the center-points are stationary (steady movement), and this is always desirable in a gearing of this kind. The pinion also has an addendum circle 19 which advantageously defines the surfaces of the pinion addenda which latter slide along the internal face of the gap-filling piece 12. The pinion teeth also form closed chambers 20 with the said piece 12 which are also able to circulate fluid in the same direction as the teeth of the annular gear wheel.

If the number of teeth and the difference in the numbers of teeth are very small as in the illustrated example, then several points of simultaneous engagement are obtained at which the flanks of teeth on both gear wheels are in contact. The total number of all possible points of engagement in each angular position of the gearing provides the theoretical line of engagement 21. However, the length of the theoretical line of engagement of the uncorrected teeth would result in the need for an extraordinarily high degree of precision in the toothing of the gearing, and the bearings of the gearwheels should have no play since otherwise effective meshing of the two wheels would no longer be possible.

Because of the continually recurrent engagement of consecutive teeth, however, this multiple tooth engagement is not necessary for ensuring a constant ratio of the angle of rotation of the two wheels. In order to have, at least nearly at all times, only one point of tooth engagement, the portions of the flanks of the pinion teeth that are adjacent the addendum circle are worked down to be set back as shown in FIG. 4.

Figure 2:
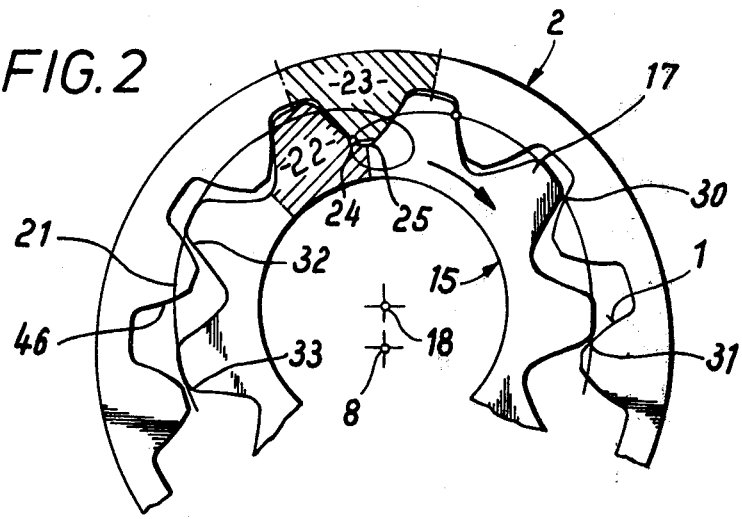
FIG. 2 shows the position of the gearwheels in which a pinion tooth is just moving into engagement with a tooth on the internally toothed annular gearwheel and at the addendum circle thereof.
Figure 3:
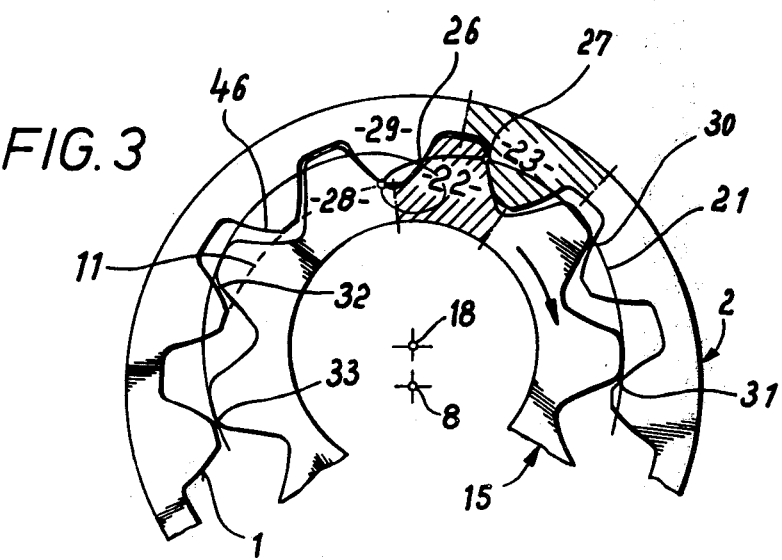
FIG. 3 illustrates a position of the two gear wheels when they have turned further in clockwise direction and in which the same pinion tooth has moved out of engagement with the tooth on the annular gear wheel, while the next tooth of the pinion is just moving into engagement with the next tooth on the annular gear wheel.

In FIG. 2, the position of the first engagement of the corrected teeth is shown in the case of the hatched teeth 22 and 23. In the case of the annular gear wheel 2 the first point of contact 24 is the point of intersection of the flank of the annular gear wheel tooth and the addendum circle of the same gear wheel 2. With regard to the pinion 15, the point of intersection 24 is approximately in the zone of the rounded portion 25 between the roots of adjacent pinion teeth. If the pinion is now further rotated in a clockwise direction to assume the position shown in FIG. 3, the point of engagement 24 of the flanks of the teeth moves on the engagement line 21 along the portion 26, which is indicated by a thickened line, to the point 27. This, however, is the angular position in which the next following teeth 28 and 29, now coming into engagement for the first time, move into contact on the addendum circle 11 of the annular gear wheel, and these teeth 28 and 29, in turn now take over the function of transmitting the rotation of the pinion 15 to the annular gear wheel 2. Thus, further tooth engagement is not necessary outside the portion 26 of the line of engagement, and this means that the flank of the pinion teeth is required to correspond to the theoretical shape, as produced by the orbital movement described hereinbefore, only on the zone of this portion 26. As the rotary movement of the two gear wheels continues beyond the point 27, contact should no longer take place between them, and the flanks of the teeth should move the farther away from each other, forming gaps at 30 and 31 etc. the longer rotation continues. For the above reasons, no contact should occur, either, forwardly of the point 24 e.g. at 30 and 31, or at the trailing flanks 32 and 33, i.e., the overlap degree of the two wheels is limited to substantially one. Therefore, either the pinion tooth should be cut down at the highest required point of engagement, which is disadvantageous in the case of rotary fluid-displacing machines, or, if it is required to retain the full tooth height in order to obtain a large delivery quantity, correction of the tooth flank at the addendum of the pinion teeth must be carried out in such manner, in accordance with the invention, that there is no engagement of teeth possible rearwardly of the portion 26 of the line of engagement 21 and forwardly of the point 24.

Figure 4:
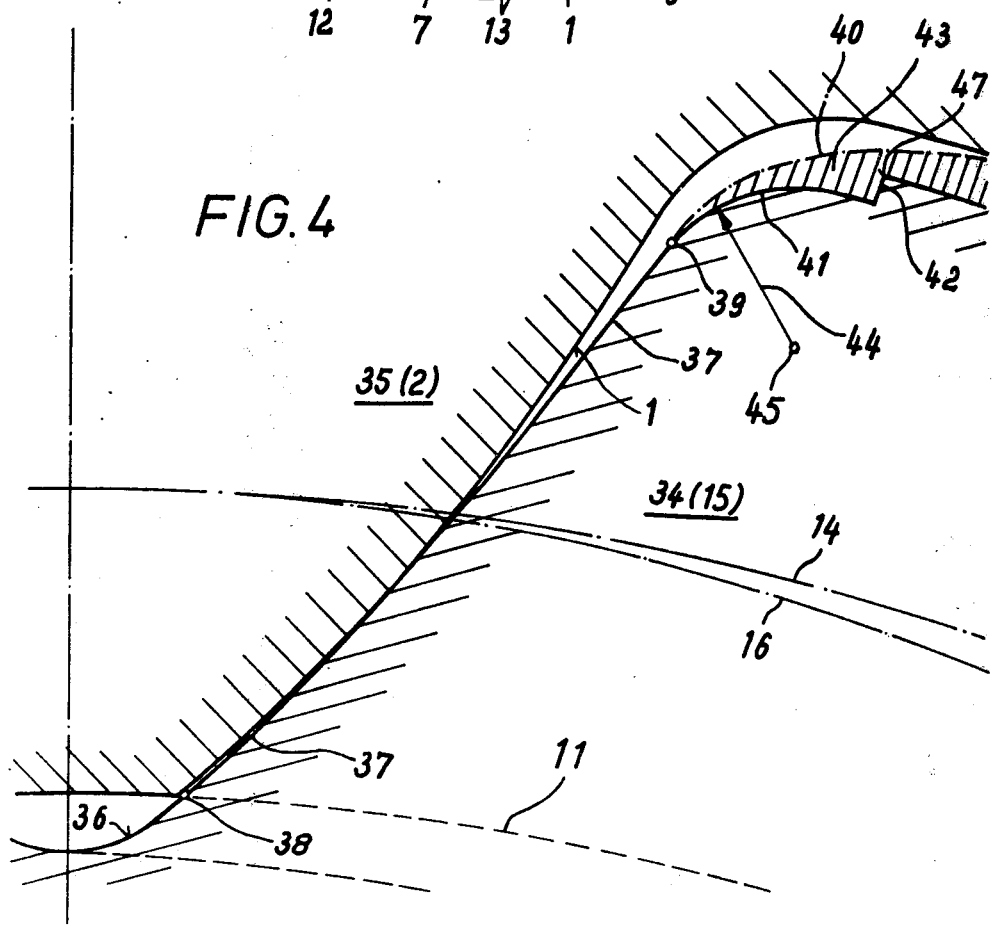
FIG. 4 illustrates, on a larger scale, a preferred form of the addendum of the pinion tooth and illustrates the theoretical tooth profile set-back outside a limited engagement zone, and its form as in accordance with the invention.

This correction is illustrated on a larger scale in FIG. 4. In this Figure, the pinion tooth is designated by the reference numeral 34 and the tooth of the annular gear wheel by the numeral 35. The numeral 36 designates the rounded portion at the root of the pinion tooth 34, and the numeral 37 indicates the limited uncorrected portion of the flank profile of the pinion tooth which portion extends from the earliest occurring engagement point 38 at the root of the tooth 34 to the last engagement point 39 on the same tooth. The dash-dotted line 40 indicates the theoretical, uncorrected continuation of the flank portion 37 of the pinion tooth 34. Line 40 represents the limit contour of all further possible lines along which the tooth 35 of the annular gear wheel can extend. The numeral 41 indicates the corrective curve for the flank of the tooth 34, which curve is set back at all points from the theoretical line 40 and, in this example, takes the form of a circular arc. As can be seen, the curve, which may be continued in a short rectilinear portion, then runs to a shaving edge of shoulder 42 which promotes effective sliding on to gap-filling piece 12. Between the curves 40 and 41, on the one hand, and the shoulder 42 on the other hand, is shown hatched the worked-off portion 43 of the tooth, which represents the clearance between teeth of the two gear wheels outside the required active engagement zone 37. Thus, FIG. 4 not only shows the required position and the correct selection of the radius 44 of the rounded portions of the tooth flank and addendum, but also the correct set-back position of the shoulder 42.

It should again be mentioned that the forms shown in the drawings simply illustrate a preferred embodiment of the hydrostatic gear machine of the invention and that this novel configuration can also be used in the case of many other at least substantially trochoidal toothing arrangements.

With regard to the construction of tooth profiles of the annular gear wheel which are defined by a curve equidistant to a hypocycloid, reference is made to our U.S. Pat. No. 3,782,040, and, in particular, to the paragraphs from column 2, line 16 to column 3, line 44, and from column 4, lines 57 to column 5, line 33 thereof.

What is claimed is:

1. A hydrostatic intermeshing gear machine with substantially trochoidal tooth profile, comprising a pair of gear wheels meshing with one another, one of said gear wheels being an internally toothed annular gear wheel having an at least substantially trochoidal tooth profile and the other wheel being an externally toothed pinion having at least two teeth less than the internally toothed wheel, the tooth profile of said pinion being equal to the profile obtained by rolling said pinion with meshing on the other wheel, the teeth of a first one of said wheels bearing their above-defined respective profile on their flanks only in a limited zone thereof having a length just sufficient to keep the angular velocity ratio of the two wheels constant throughout rotation of the wheels, and the zones of the flanks of the teeth of said first one of said wheels extending outwardly from said limited zone toward the tip of the tooth being undercut by a sufficient distance to eliminate contact with the teeth of the other wheel, the overlap degree of the two wheels being substantially one, the undercutting having an arc-shaped profile increasing from zero adjacent said limited zone gradually in the direction toward the tip of the respective tooth, the machine comprising further a cresent-shaped gap-filling piece in the range intermediate the addendum circles of said pinion and said annular gear wheel which range is opposite that of maximum meshing of the teeth of both wheels, the addendum faces of the latter sealingly sliding along said gap-filling piece.

2. The hydrostatic gear machine of claim 1, wherein said first gear wheel is said pinion.

3. The hydrostatic gear machine of claim 1, wherein the teeth of the annular gear as well as of the pinion are exactly symmetrical.

4. The hydrostatic gear machine of claim 1, wherein the ratio of the number of pinion teeth to the number of annular gear teeth is a fraction the numerator and the denominator of which are relatively prime.

5. The hydrostatic gear machine of claim 1, wherein the distance between the flanks, turned toward one another, of adjacent teeth of said annular gear wheel, measured along the pitch circle of the latter, is equal to the distance of the two flanks of one and the same tooth of said annular gear wheel, also measured on the pitch circle thereof.

6. The hydrostatic gear machine of claim 1, wherein the portion of the addendum adjacent said set-back tooth flank is set back from at least a portion of the hypothetical addendum profile resulting from the rolling of said first wheel on the other wheel, by a sufficient distance to eliminate contact of said set-back addendum portion with the teeth of the other gear wheel.

7. The hydrostatic gear machine of claim 6, wherein the teeth of said pinion have at their addenda small steps formed between the set-back tooth flank and the set-back addendum portion.

8. The hydrostatic gear machine of claim 7, wherein the step is a fraction of a millimeter high.

9. The hydrostatic gear machine of claim 7, wherein said set-back tooth flank portion is set back more deeply than said set-back addendum portion.

10. The hydrostatic gear machine of claim 1, wherein said set-back adjacent addendum portion has the profile of a circular arc.

11. The hydrostatic gear machine of claim 10, wherein the center of the circular arc is located on a line perpendicular to the theoretical tooth flank profile at the end of the latter where the flank joins the addendum.

12. The hydrostatic gear machine of claim 1, wherein the profile of the tooth flanks of the annular gear is a convex circular arc.

13. The hydrostatic gear machine of claim 12, wherein those flanks of two adjacent teeth of said annular gear which face away from each other extend along a common circular arc.

14. The hydrostatic gear machine of claim 1, wherein said pinion has two or three teeth less than said annular gear wheel.

15. The hydrostatic gear machine of claim 14, wherein said annular gear wheel has from 9 to 15 teeth.

16. The hydrostatic gear machine of claim 14, wherein said annular gear wheel has 9 or 11 teeth.

* * * * *